(12) United States Patent
Voegeli et al.

(10) Patent No.: US 9,873,297 B2
(45) Date of Patent: Jan. 23, 2018

(54) TUBELESS TIRE RIM CLAMP ASSEMBLY (71) Applicants: Timothy Voegeli, Wichita, KS (US); Philip Voegeli, Wichita, KS (US)

(72) Inventors: Timothy Voegeli, Wichita, KS (US); Philip Voegeli, Wichita, KS (US)

(*) Notice: Subject to any disclaimer, the term of this patent is extended or adjusted under 35 U.S.C. 154(b) by 334 days.

(21) Appl. No.: 14/623,203

(22) Filed: Feb. 16, 2015

(65) Prior Publication Data
US 2015/0239310 A1 Aug. 27, 2015

Related U.S. Application Data (60) Provisional application No. 61/945,249, filed on Feb. 27, 2014.

(51) Int. Cl.
B60C 25/01 (2006.01)
B60S 5/00 (2006.01)
B60B 30/06 (2006.01)
B60C 25/02 (2006.01)

(52) U.S. Cl.
CPC ........ *B60C 25/02* (2013.01); *B60B 2900/523* (2013.01); *B60Y 2200/13* (2013.01); *Y10T 29/49494* (2015.01)

(58) Field of Classification Search
CPC ......... B60C 25/00; B60C 25/01; B60C 25/02; B60C 25/132; B25B 27/0071; B25B 3/00; B25B 5/00; B25B 5/06; B25B 5/14; B25B 5/16; B25B 9/02; B25B 2900/523; B25B 30/06; B25B 7/02; B60S 5/00; B60Y 2200/13; F16B 2/02; F16B 2/10; Y10T 24/02; Y10T 24/10; Y10T 24/44; Y10T 24/44009; Y10T 24/44376; Y10T 29/49494
See application file for complete search history.

(56) References Cited

U.S. PATENT DOCUMENTS

| 1,452,596 | A |   | 4/1923  | De Fernelmont |
| 1,751,155 | A | * | 3/1930  | Heny et al. ............... B25B 7/02 81/385 |
| 1,885,579 | A |   | 11/1932 | Boynton |
| 2,277,081 | A | * | 3/1942  | De Lillo ................... B25B 7/02 140/106 |
| 2,402,022 | A |   | 6/1946  | Corbell |
| 2,485,700 | A | * | 10/1949 | Cook ....................... B60C 25/02 157/1.17 |
| 2,520,330 | A |   | 8/1950  | Northrup et al. |
| 3,496,616 | A | * | 2/1970  | Vazquez ................... B25B 9/02 15/150 |
| 3,908,490 | A | * | 9/1975  | Durham .................. B60C 25/02 81/420 |
| 4,063,333 | A | * | 12/1977 | Schweitzer ............. D06F 55/02 24/501 |
| 4,175,306 | A | * | 11/1979 | Bigelow ............... A47G 25/485 24/507 |

(Continued)

Primary Examiner — David B Thomas
(74) Attorney, Agent, or Firm — Kagan Binder, PLLC (57) ABSTRACT Described herein is a wheel rim clip or clamp that is used to assist the user in mounting or remounting a bicycle tire on a wheel, thereby allowing the user to use both hands in mounting the tire around the wheel (tubeless or a tube/inner tube assembly). Furthermore, the rim clip allows a user to mount or remove a tire from a wheel rim with or without a work stand.

11 Claims, 9 Drawing Sheets (56) References Cited

U.S. PATENT DOCUMENTS

| | | | |
|---|---|---|---|
| 4,559,853 A * | 12/1985 | Oye | B25B 7/02 294/118 |
| 4,589,462 A | 5/1986 | Giles | |
| 4,785,865 A | 11/1988 | Folstad | |
| 4,945,613 A * | 8/1990 | Ledermann | D06F 55/02 24/501 |
| 5,041,028 A * | 8/1991 | Stohle | B25B 5/06 439/822 |
| 5,141,211 A | 8/1992 | Adams, Jr. | |
| 5,265,661 A | 11/1993 | Tran | |
| 6,269,861 B1 * | 8/2001 | Tran | B60C 25/04 157/1.1 |
| 6,308,597 B1 * | 10/2001 | Stahle | B23K 37/04 81/302 |
| 6,842,951 B1 * | 1/2005 | Barre | B25B 7/00 24/499 |
| 7,124,800 B2 | 10/2006 | Tran | |
| 7,513,288 B2 * | 4/2009 | Corghi | B60C 25/02 157/1.17 |
| 7,600,305 B2 | 10/2009 | Ploeger et al. | |
| 8,201,310 B1 * | 6/2012 | Abdi | A47G 25/48 24/499 |
| 8,348,251 B2 * | 1/2013 | Gallo | D05B 35/02 24/507 |
| 8,672,307 B1 * | 3/2014 | Pacheco | B25B 5/06 269/3 |
| 2012/0097810 A1 | 4/2012 | Burnett | |
| 2012/0137477 A1 * | 6/2012 | Daugherty | A41F 1/00 24/499 |
| 2013/0037222 A1 | 2/2013 | White | |
| 2013/0192767 A1 * | 8/2013 | Hermansen | B60C 25/02 157/1.3 |
| 2013/0306543 A1 * | 11/2013 | Beisser | A61M 5/1418 210/321.6 |
| 2014/0083626 A1 | 3/2014 | Voegeli et al. | |
| 2014/0238200 A1 | 8/2014 | Ellis | |
| 2016/0032950 A1 * | 2/2016 | Owens | F16B 2/06 435/289.1 |

* cited by examiner

TUBELESS TIRE RIM CLAMP ASSEMBLY

CLAIM OF PRIORITY

This application claims priority to and the benefit of the provisional application having Ser. No. 61/945,249 with a filing date of Feb. 27, 2014, which is herein incorporated by reference in its entirety.

FIELD OF THE INVENTION

The invention relates generally to tools for making bicycle repairs and changing and repairing bicycle tires.

BACKGROUND OF THE INVENTION

More and more companies are moving towards incorporating tubeless bicycle tires in their bicycle designs. Major sponsors of the Tour De France are now showing off their new tubeless wheels. However one of the major challenges to transitioning to tubeless tires is the need for adding additional sealant to the tires during installation and regularly about every two to six months. Further, since tubeless tires are designed to fit tightly inside the rim of the wheel they are typically made to be smaller than the outer rim of the wheel thereby making them more difficult to put on and take off of the rim for repairs, cleaning and/or resealing.

When repairing traditional bicycle tires with inner tubes, although the tire is not as "snug" as the tubeless tire, trying to hold the tire and inner tube assembly in place while placing them on the wheel rim can also be challenging.

Therefore there is a need in the bicycle repair industry and by avid cyclists for a device that can be used with any work stand in the market or even without a work stand that will address the various service and repair needs of mounting or remounting bicycle tires on wheels.

SUMMARY OF THE INVENTION

It would be advantageous to have a wheel rim clip or clamp, as described herein, that is used to assist the user in mounting or remounting a tire on a wheel, thereby allowing the user to use both hands in mounting the tire around the wheel (tubeless or a tube/inner tube assembly). Furthermore, it would also be advantageous to have a rim clip that allows a user to mount a tire with or without a work stand. Therefore, there currently exists a need in the market for a rim clip or clamp, as described herein, that is simple to use and in a related embodiment is collapsible for easy and compact storage.

In one example embodiment, the rim clip described herein is comprised of three parts: two outer levers that are about 2 inches long that have a pivot point offset from the center with a small clamp end on one side and a flat outside end on the other end. The other part is a "U" shaped spring which holds the two sides together and pushes the clamp ends or jaws together. The rim clip is held closed on the clamp side and is opened by applying pressure to the flat sides. The clip is designed to be attached to the outside and inside of a bicycle rim to hold the tire bead into the rim well when the tire is being mounted. The clamp end is formed so as to hold onto a bicycle wheel rim during use with spring pressure from the spring clip. This acts as a virtual third hand and allows the installer an easier tire setup.

In another example embodiment, a bicycle wheel clamp assembly includes a first lever member having a flat jaw portion and an elongate first handle portion and a second lever member having a rounded jaw portion and a second handle portion. The first lever member and the second lever member are adapted to be operatively coupled at a pivot point such that the rounded jaw portion makes contact with the flat jaw portion to form a wheel rim gripping clamp assembly configured to stay on the wheel rim when the flat jaw portion is located on an outside surface of the wheel rim.

In another related example embodiment, a bicycle wheel clamp apparatus includes a wheel rim gripping assembly adapted to snuggly fit over an outside and an inner surface of a wheel rim, the gripping assembly having at least two legs that are each of sufficient length to maintain the gripping assembly on the wheel rim. The clamp apparatus also includes a handle apparatus operatively coupled to the wheel rim gripping assembly, the handle apparatus configured to mount and remove the wheel rim gripping assembly from the wheel rim.

In yet another example embodiment, a bicycle wheel clamp assembly includes a first lever member having a flat jaw portion and an elongate first handle portion, the first lever member further including a tool member disposed on an end of the first handle portion that is remote from the flat jaw portion, the tool member adapted for mounting or removing a tire from a wheel rim. The clamp assembly includes a second lever member having a rounded jaw portion and a second handle portion, wherein the first lever member and the second lever member are adapted to be operatively coupled at a pivot point such that the rounded jaw portion makes contact with the flat jaw portion to form a wheel rim gripping clamp assembly configured to stay on the wheel rim when the flat jaw portion is located on an outside surface of the wheel rim.

The invention now will be described more fully hereinafter with reference to the accompanying drawings, which are intended to be read in conjunction with both this summary, the detailed description and any preferred and/or particular embodiments specifically discussed or otherwise disclosed. This invention may, however, be embodied in many different forms and should not be construed as limited to the embodiments set forth herein; rather, these embodiments are provided by way of illustration only and so that this disclosure will be thorough, complete and will fully convey the full scope of the invention to those skilled in the art.

DETAILED DESCRIPTION OF THE INVENTION

Following are more detailed descriptions of various related concepts related to, and embodiments of, methods and apparatus according to the present disclosure. It should be appreciated that various aspects of the subject matter introduced above and discussed in greater detail below may be implemented in any of numerous ways, as the subject matter is not limited to any particular manner of implementation. Examples of specific implementations and applications are provided primarily for illustrative purposes.

The various embodiments of the invention are directed to a wheel rim clip or clamp assembly and bicycle tool that are used to assist the user in mounting or remounting a bicycle tire on a wheel, thereby allowing the user to use both hands in mounting the tire around the wheel. The rim clip is designed to help with the installation, and removal of bicycle tires onto and off of the bicycle wheel rim when its attached to outside and inside of a bicycle wheel rim to hold the tire bead into the inside of the rim when a tire is being mounted. The clamp assembly and bicycle tool is applicable to mounting, remounting or removing tubeless and tube/inner tube assemblies for almost any bicycle tire. Furthermore, the rim clip assembly, in at least one example embodiment, allows a user to mount or remove a tire from a wheel rim with or without a work stand.

Figure 6:
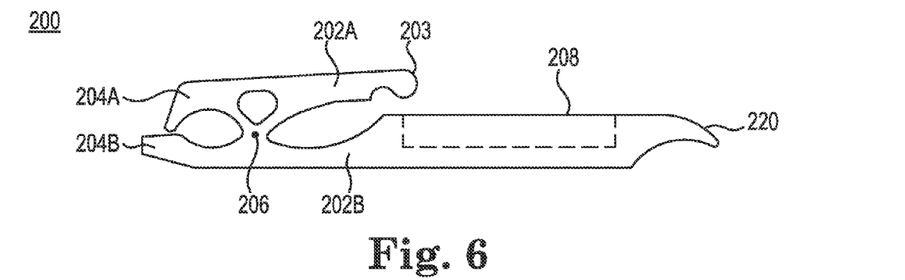
FIG. 6 illustrates a side view of an example embodiment of a fully assembled long rim clip assembly and bicycle tool.
Figure 6A:
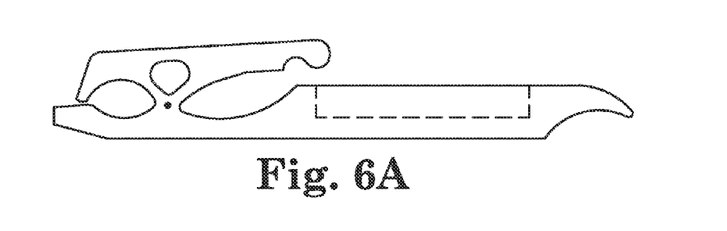
FIGS. 6A-6E illustrate left side, top, bottom, right end and left end views, respectively, of the long rim clip assembly and bicycle tool shown in FIG. 6.
Figure 6B:
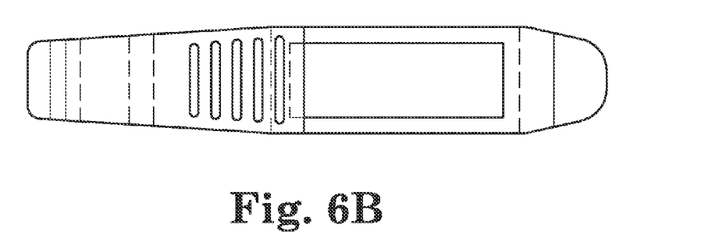
Figure 6C:
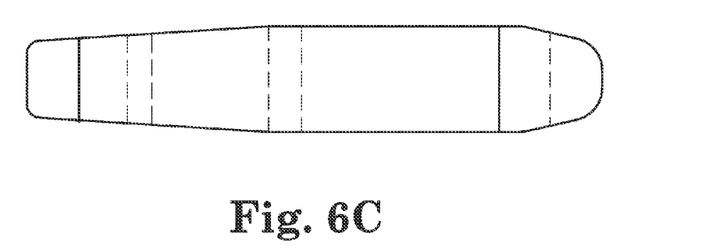
Figure 6D:
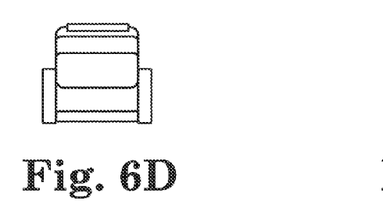
Figure 6E:
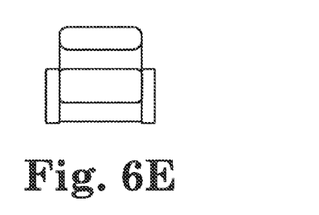
Figure 7:
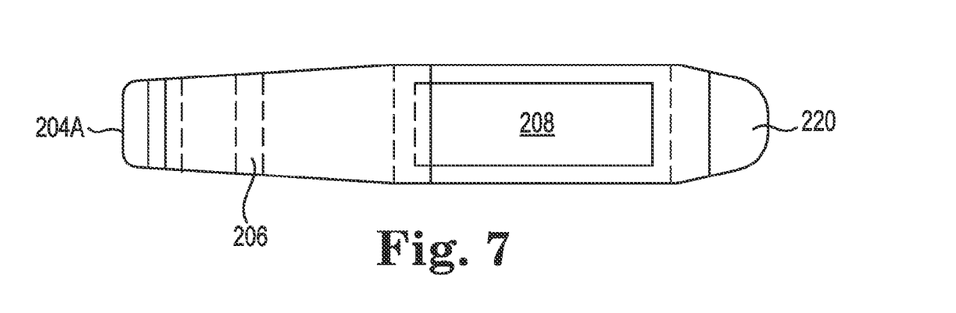
FIG. 7 illustrates a top view of an example embodiment of the long rim clip assembly.
Figure 8:
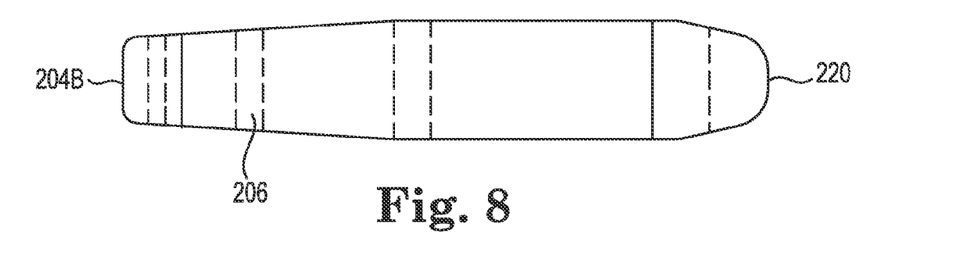
FIG. 8 illustrates a bottom view of an example embodiment of the long rim clip assembly.
Figure 9:
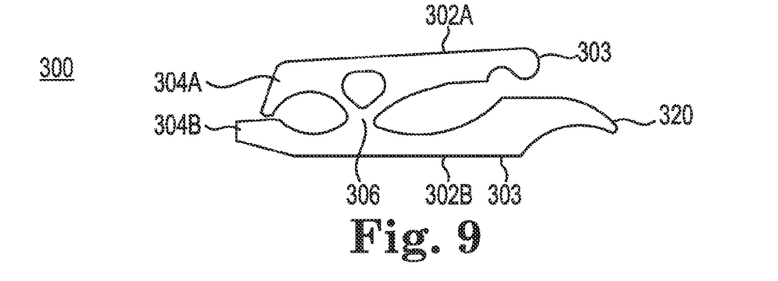
FIG. 9 illustrates a side view of an example embodiment of a short rim clip assembly and bicycle tool.
Figure 9A:
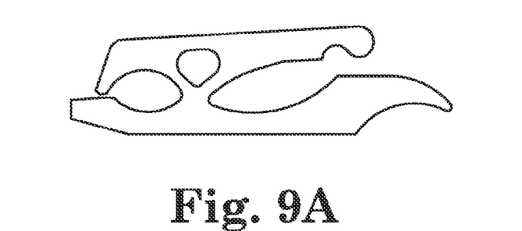
FIGS. 9A-9E illustrate left side, top, bottom, right end and left end views, respectively, of the short rim clip assembly and bicycle tool shown in FIG. 9.
Figure 9B:
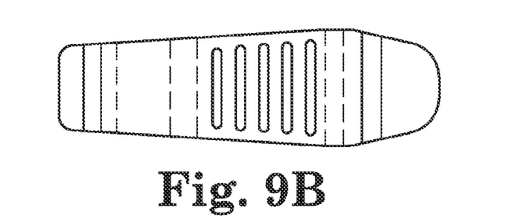
Figure 9C:
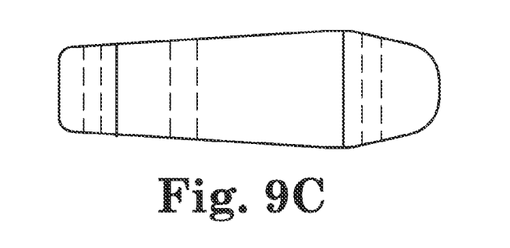
Figure 9D:
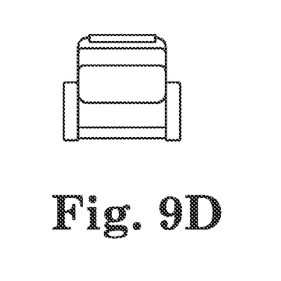
Figure 9E:
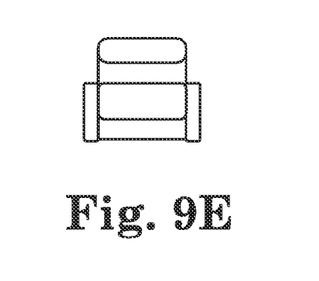
Figure 10:
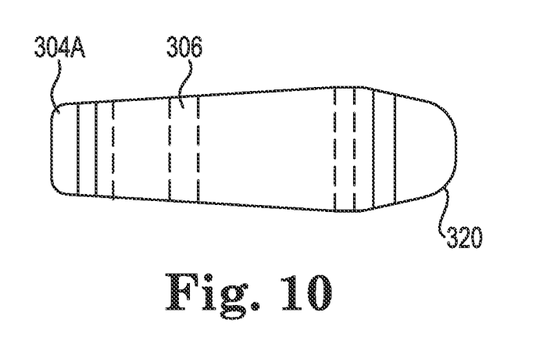
FIG. 10 illustrates a top view of an example embodiment of the short rim clip assembly and bicycle tool.
Figure 11:
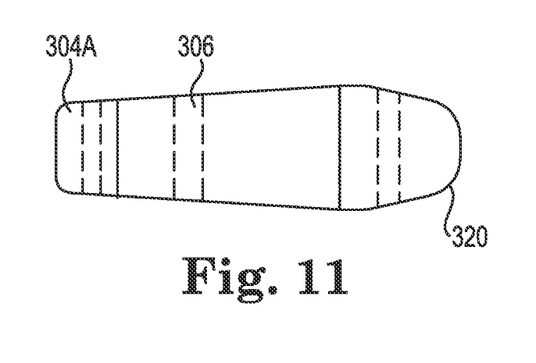
FIG. 11 illustrates a bottom view of an example embodiment of the short rim clip assembly and bicycle tool.
Figure 12:
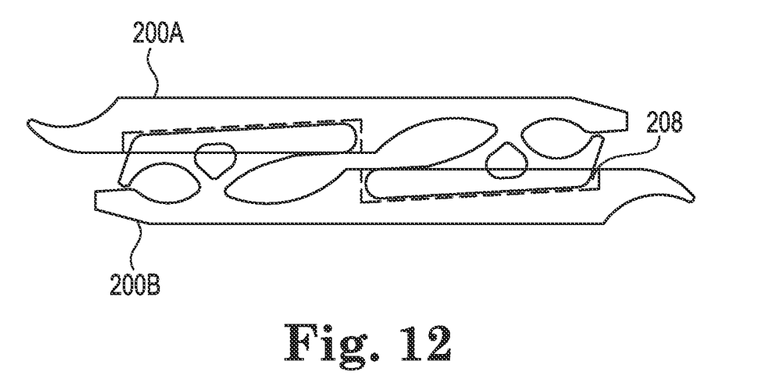
FIG. 12 illustrates an example embodiment of two long rim clip assemblies that are "fitted together" for compact storage.
Figure 13:
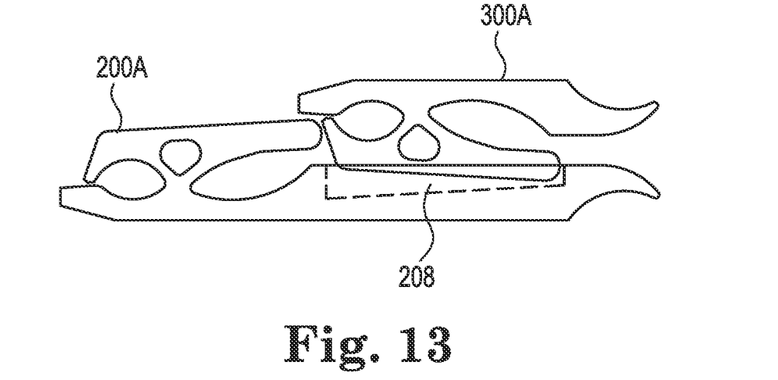
FIG. 13 illustrates an example embodiment of a long rim clip assembly and a short rim clip assembly that are "fitted together" for compact storage.
Figure 14A:
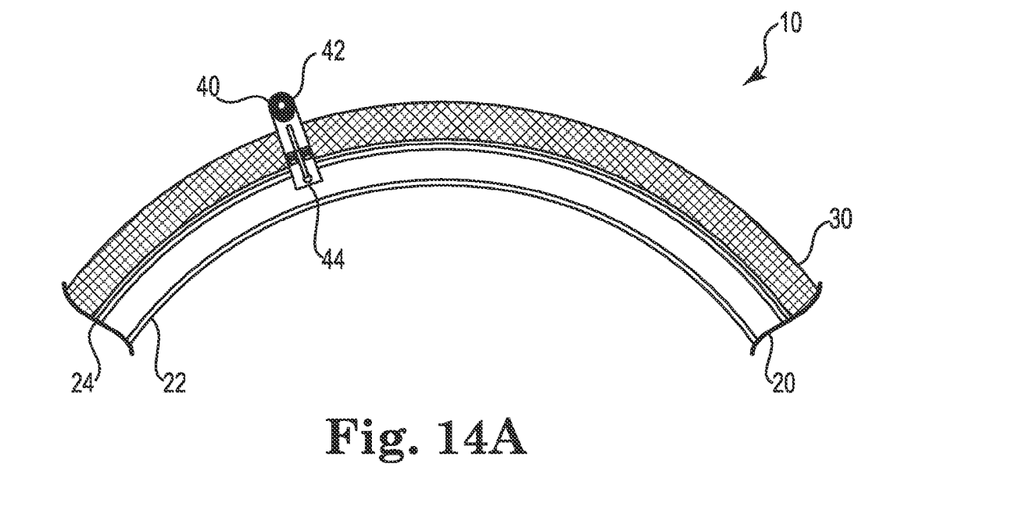
FIGS. 14A-14B illustrate a front view and a side cutaway view of a tire being mounted on a wheel rim using a rim clip according to an example embodiment of the invention.
Figure 14B:
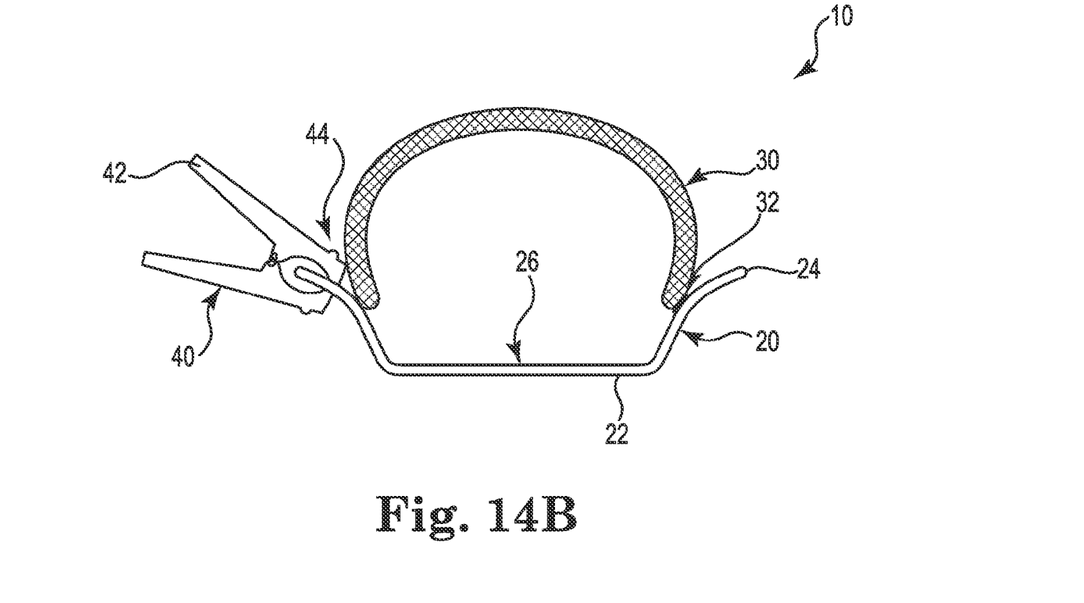

Referring now to the Figures, generally FIGS. 1-5 illustrate an example embodiment of a rim clip device without a bicycle removal tool; FIGS. 6-8 illustrate an example embodiment of a long rim clip assembly and bicycle tool; and FIGS. 9-11 illustrate an example embodiment of a short rim clip assembly and bicycle tool. FIGS. 12-13 illustrate collapsible versions of the rim clip assembly and bicycle tools that are fitted together for easy and compact storage. FIGS. 14A and 14B illustrate generally how the various rim clip devices described herein are used to mount a tire on a wheel rim according to an example embodiment of the invention.

In order to have a better understanding of the manner in which the various rim clip or clamp assemblies are used, FIGS. 14A and 14B will be discussed first. FIGS. 14A and 14B illustrate, respectively, front and side cutaway views of a tire being mounted on a wheel rim using a rim clip according to an example embodiment of the invention. In this example embodiment of mounting a tire, there is provided a tire and wheel assembly 10 that includes a wheel rim 20 and a bicycle tire 30 (tubeless or tube/inner tube assembly) and a rim clip assembly 40 already mounted on a side wall 24 of wheel rim 20 that need not touch a lower flatter portion 22 of rim 20 (see FIG. 14B). In this example embodiment, rim clip 40 includes a pair of lever members 42 adapted to open a pair of grips 44 that serve to clip or clamp onto the side wall 24, thereby helping to keep part of tire 30 and tire bead 32 within rim well 26 while the user is mounting the remaining part of tire 30 to rim 20. Without rim clip 40, a user will have to use one hand to hold tire 30 in place while having to spin wheel 20 around and put tire 30 in rim well 26 with the other hand.

In the case of tubeless tires, which are more tightly fitted to the rim, the last several inches of the tire bead to be inserted onto the rim may require two hands to be used on one end of the tire bead to try to force the tire bead onto the rim. This leaves the other end of the tire bead which is not yet inserted onto the rim, to slip, or roll off of the rim. The rim clip or clamp described herein allows for the user to use both hands on one end of the tire bead to be put it onto the rim without worry of the opposite end of the tire bead coming off. The rim clip keeps the tire bead held into the rim 26 at all times. This also works as well for tires using inner tubes.

Figure 1:
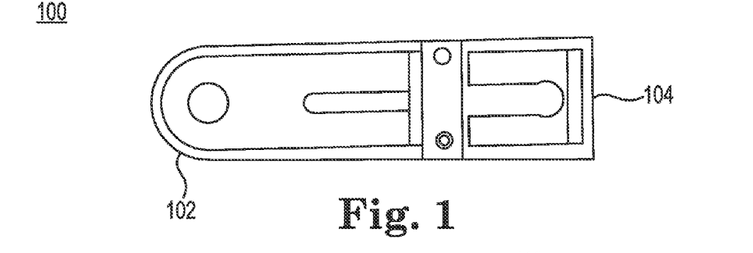
FIG. 1 illustrates a bottom view an example embodiment of a rim clip or clamp device or assembly.
Figure 2:
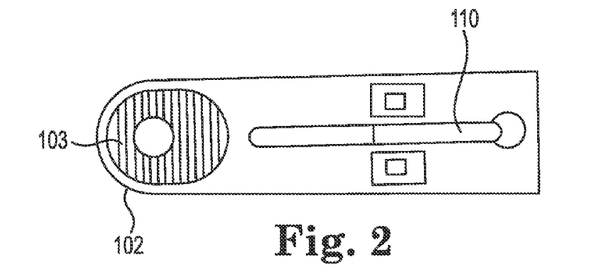
FIG. 2 illustrates a top view of an example embodiment of the rim clip.
Figure 3:
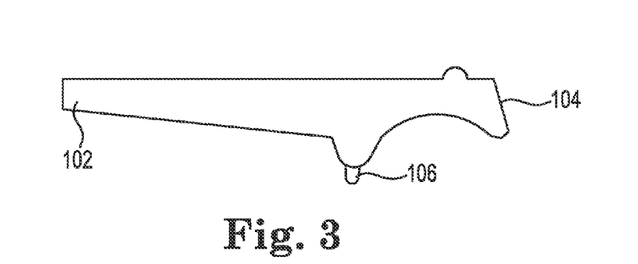
FIG. 3 illustrates a side view of a lever member or unit of the rim clip assembly according to an example embodiment of the rim clip.
Figures 4, 5:
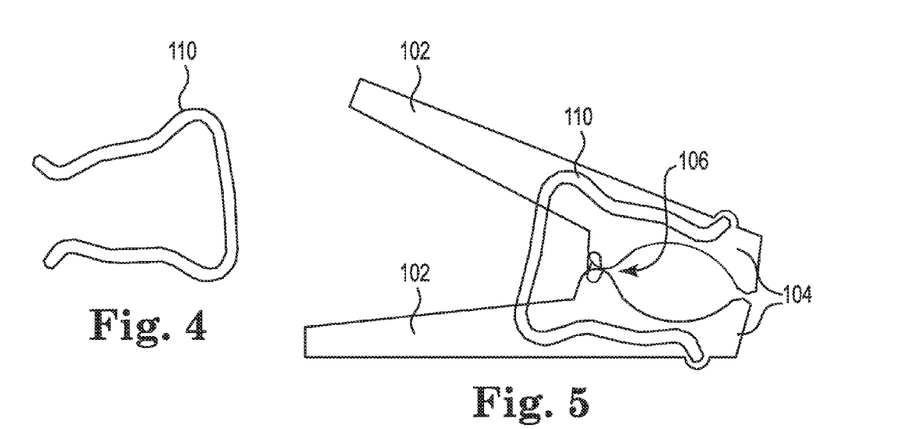
FIG. 4 illustrates a spring clip that is part of a rim clip assembly according to an example embodiment of the rim clip.
FIG. 5 illustrates a fully assembled view an example embodiment of the rim clip assembly.
Figure 5A:
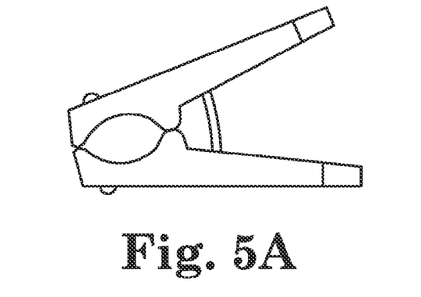
FIGS. 5A-5E illustrate left side, top, bottom, right end and left end views, respectively, of the fully assembled rim clip assembly shown in FIG. 5.
Figure 5B:
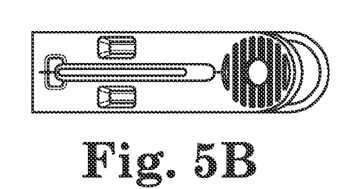
Figure 5C:
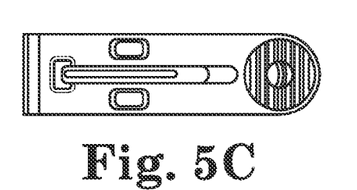
Figure 5D:
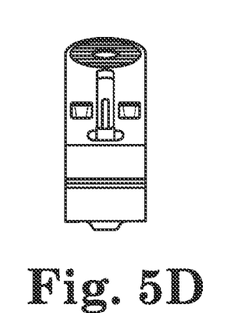
Figure 5E:
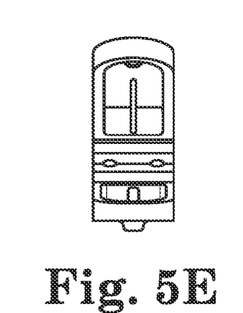

The various embodiments of the rim clip assemblies will be described hereinafter as they each provide various advantages for the user in mounting or removing bicycle tires. In FIGS. 1-2 illustrate a bottom and top view an example embodiment of a rim clip or clamp device or assembly 100, while FIG. 5 illustrates a fully assembled view an example embodiment of the rim clip assembly 100. FIGS. 5A-5E illustrate left side, top, bottom, right end and left end views, respectively, of the fully assembled rim clip assembly shown in FIG. 5. FIG. 3 illustrates a side view of a lever member 102 of the rim clip assembly while FIG. 4 illustrates a spring clip that is part of a rim clip assembly 100. Clip assembly 100 includes a pair of lever members 102 that are assembled with a spring clip 110 to form gripping jaws 104 for gripping a wheel rim. When lever members 102 are depressed at pads 103, the lever members or arms pivot about a pivot point 106 to open or close jaws 104. This is illustrated as well in FIG. 14B. In this example embodiment, rim clip 100 is about 2 inches in length.

In another example embodiment, FIGS. 6-8 illustrate side, top and bottom views of an example embodiment of a fully assembled long rim clip assembly and bicycle tool 200. Clip assembly 200 includes a pair of lever members 202A (with optional pad 203) and 202B that are assembled at a molded (or plastic bridge) pivot point 206 (optionally a spring clip can also be used for more rugged construction) to form a pair of gripping jaws 204A and 204B for gripping a wheel rim. The plastic bridge will allow enough flexibility for the jaws to open to attach the clip assembly to the bicycle wheel rim, but will hold onto the rim tight enough not to allow the clip assembly to fall off. When lever members 202A and 202B are depressed at pads 203, the lever members or arms pivot about pivot point 206 to open or close jaws 204A and 204B.

Clip 200 includes an optional slot 208 along lever member 202B for compact storage, to be described in more detail later in this application.

Figure 14C:
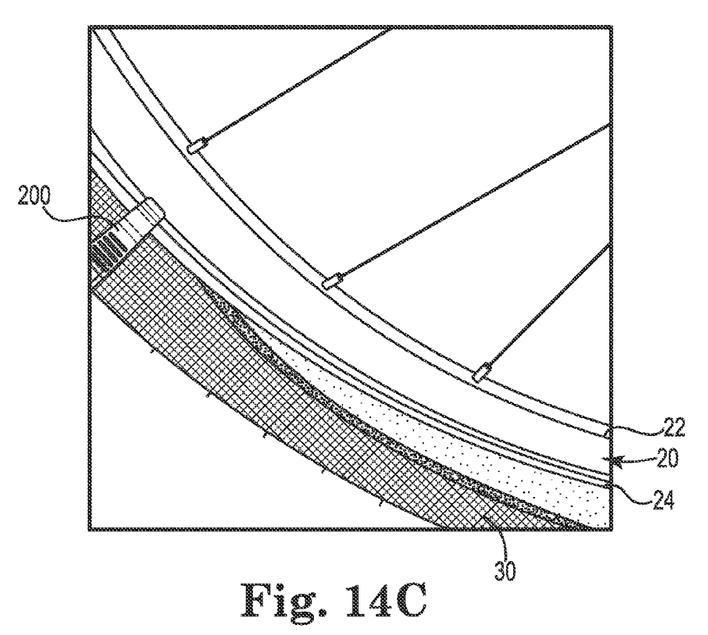
FIGS. 14C-14D illustrate front views of a tire being mounted on a wheel rim using the long rim clip and the short rim clip, respectively, according to an example embodiments of the invention.
Figure 14D:
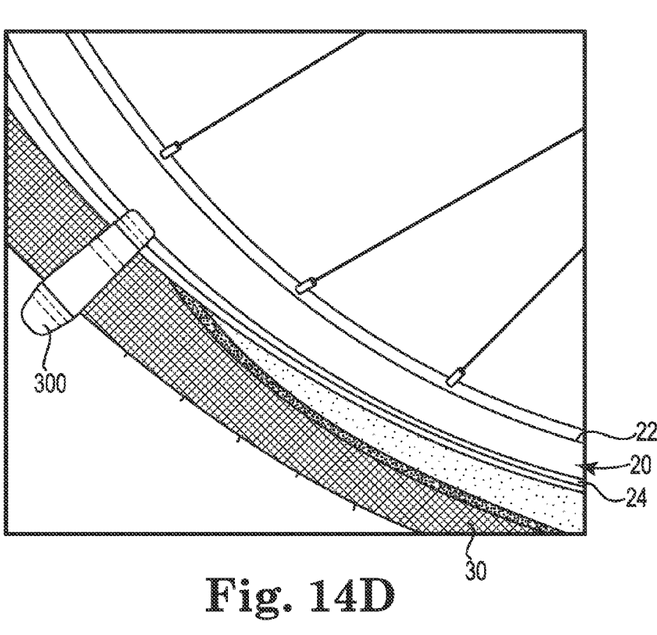

Jaws 204 of clip 200 are made so that one side is flat (204B) and about ⅜ of an inch in length, for example, and goes on the outside (24) of rim 20 with the longer length stopping clip 200 from rolling off the wheel rim. The other side of jaws 204, namely 204A, is rounded and is only about ⅛ of an inch in length, for example. This side is designed to go into the inside of the bicycle wheel rim 20 and is designed to clip under a bead lip 32 of the inside of the bicycle wheel rim 20. This is illustrated as well in FIG. 14B. In this example embodiment, rim clip 200 is about 4.5 inches in length and about ⅞ inches in width, but is not limited to such dimensions, with the side of clip 200, namely jaw 204B, having a tool member, such as a hook end 220. Hook 220 (with a suggested radius of about 0.5 inch radius) can be used to help in the mounting or removal of the tire onto the bicycle wheel rim. Other tool members include, but are not limited to, a flat edge such as a flat head screwdriver or other configurations useful in bicycle maintenance. FIGS. 14C-14D illustrate front views of a tire being mounted on a wheel rim using the long rim clip and the short rim clip, respectively, according to an example embodiments of the invention.

In yet another example embodiment, FIGS. 9-11 illustrate side, top and bottom views of an example embodiment of a short rim clip assembly and bicycle tool 300. Clip assembly 300 includes a pair of lever members 302A and 302B (with optional pads 303) that are assembled at a molded (or plastic bridge) pivot point 306 (optionally a spring clip can also be used for more rugged construction) to form a pair of gripping jaws 304A and 304B for gripping a wheel rim, such as rim 20. When lever members 302A and 302B are depressed at pads 303, the lever members or arms pivot about pivot point 306 to open or close jaws 304A and 304B. Jaws 304 of clip 300 are made so that one side is flat (304B) and about ⅜ of an inch in length, for example, and goes on the outside (24) of rim 20 with the longer length stopping clip 300 from rolling off the wheel rim. The other side of jaws 304, namely 304A, are rounded and only about ⅛ of an inch in length, for example. This side is designed to go into the inside of bicycle wheel rim 20 and is designed to clip under a bead lip 32 of the inside of bicycle wheel rim 20. This is illustrated as well in FIG. 14B. In this example embodiment, rim clip assembly and tool 300 is about 2.75 inches in length and about ⅞ inches in width, but is not limited to such dimensions, with the side of clip 300, namely jaw 304B, having a hook end 320, being approximately 2.75 inches long. Hook 320 (with a suggested radius of about 0.5 inch radius) can be used to help in the mounting or removal of the tire onto the bicycle wheel rim. FIGS. 9A-9E illustrate left side, top, bottom, right end and left end views, respectively, of the short rim clip assembly and bicycle tool shown in FIG. 9.

In yet another embodiment, FIG. 12 illustrates an example embodiment of two long rim clip assemblies 200A and 200B that are "fitted together" for compact storage by placing a portion of one clip in slot 208. In a related embodiment, FIG. 13 illustrates an example embodiment of a long rim clip assembly 200A and a short rim clip assembly 300A that are "fitted together" for compact storage.

In a related embodiment, the rim clip is made from a single molded piece in the shape of two-pronged fork with a handle (similar to a tuning fork shape), wherein the prongs are close together and create a pressure fit over the wheel rim, thereby eliminating the levering motion. In another embodiment, the "clip" is in the shape of an oversized "H"; "M"; "N"; "U" or "V" so that it can be slipped over the wheel rim to keep the tube/tire in place. Hence the rim clip concept is not limited to a levering device. The various embodiments described herein can be made of a number of materials, including but not limited to, plastic, metal, wood, aluminum, steel and any combination thereof.

The following patent publication is incorporated by reference in its entirety: U.S. Patent Publication 2014/0083626.

While the invention has been described above in terms of specific embodiments, it is to be understood that the invention is not limited to these disclosed embodiments. Upon reading the teachings of this disclosure many modifications and other embodiments of the invention will come to mind of those skilled in the art to which this invention pertains, and which are intended to be and are covered by both this disclosure and the appended claims. It is indeed intended that the scope of the invention should be determined by proper interpretation and construction of the appended claims and their legal equivalents, as understood by those of skill in the art relying upon the disclosure in this specification and the attached drawings.

We claim:

1. A bicycle wheel clamp assembly comprising:
   a first lever member having a flat jaw portion and an elongate first handle portion; and
   a second lever member having a rounded jaw portion and a second handle portion;
   wherein the first lever member and the second lever member are adapted to be operatively coupled at a pivot point such that the rounded jaw portion makes contact with the flat jaw portion to form a wheel rim gripping clamp assembly configured to stay on a wheel rim when the flat jaw portion is located on an outside surface of the wheel rim, wherein the first lever member includes a tool member disposed on an end of the first handle portion that is remote from the flat jaw portion, the tool member adapted for mounting or removing a tire from the wheel rim.

2. The bicycle wheel clamp assembly of claim 1 wherein the rounded jaw portion is configured to be located under a bead lip of an inside surface of the wheel rim.

3. The bicycle wheel clamp assembly of claim 1 wherein the first lever member is greater in length than the second lever member.

4. The bicycle wheel clamp assembly of claim 3 wherein the elongate portion of the first lever member includes a slot disposed between the flat jaw portion and the tool member.

5. The bicycle wheel clamp assembly of claim 4 wherein the tool member includes a hook-like member.

6. The bicycle wheel clamp assembly of claim 1 wherein the tool member includes a hook-like member.

7. The bicycle wheel clamp assembly of claim 1 wherein the pivot point comprises a flexible bridge member.

8. The bicycle wheel clamp assembly of claim 1 wherein the pivot point is formed with a spring clip member configured to join the first and second lever members.

9. The bicycle wheel clamp assembly of claim 1 wherein the elongate portion of the first lever member includes a slot disposed between the flat jaw portion and the tool member, the slot adapted to accept a portion of a second wheel clamp assembly for compact storage.

10. The bicycle wheel clamp assembly of claim 1 wherein the first and second lever members are configured into a single molded clip in the shape of a tuning fork and the following shapes: H shape; an M shape; an N shape; a U shape and a V shape; wherein a portion of the molded clip shape serves as the rim gripping assembly and another portion serves as the handle apparatus.

11. A bicycle wheel clamp assembly comprising:
- a first lever member having a flat jaw portion and an elongate first handle portion, the first lever member further including a tool member disposed on an end of the first handle portion that is remote from the flat jaw portion, the tool member adapted for mounting or removing a tire from a wheel rim; and
- a second lever member having a rounded jaw portion and a second handle portion; wherein the first lever member and the second lever member are adapted to be operatively coupled at a pivot point such that the rounded jaw portion makes contact with the flat jaw portion to form a wheel rim gripping clamp assembly configured to stay on the wheel rim when the flat jaw portion is located on an outside surface of the wheel rim.

\* \* \* \* \*